(12) United States Patent
Bates et al.

(10) Patent No.: US 7,911,726 B2
(45) Date of Patent: Mar. 22, 2011

(54) MANAGING DATA STORAGE MEDIA AND MULTIPLE CARTRIDGE MEMORIES OF A DATA STORAGE CARTRIDGE

(75) Inventors: Allen Keith Bates, Tucson, AZ (US); Nils Haustein, Soerganloch (DE); James William Johnson, Tucson, AZ (US); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/581,066

(22) Filed: Oct. 16, 2009

(65) Prior Publication Data

US 2010/0039726 A1 Feb. 18, 2010

Related U.S. Application Data

(63) Continuation of application No. 11/367,058, filed on Mar. 3, 2006, now Pat. No. 7,660,063.

(51) Int. Cl.
*G11B 5/02* (2006.01)
*G11B 23/02* (2006.01)
*G06F 12/00* (2006.01)

(52) U.S. Cl. ............................ 360/55; 360/132; 711/115
(58) Field of Classification Search ................ 360/1, 55, 360/132; 711/115
See application file for complete search history.

(56) References Cited

U.S. PATENT DOCUMENTS

| 5,461,704 A | 10/1995 | Wakabayashi et al. ...... 358/1.15 |
| 6,631,106 B1 | 10/2003 | Numata et al. ............. 369/53.17 |
| 7,375,910 B2 | 5/2008 | Bates et al. ...................... 360/55 |
| 2006/0026623 A1 | 2/2006 | Asano ............................ 720/729 |
| 2009/0313448 A1* | 12/2009 | Gokhale et al. ............... 711/162 |
| 2010/0031054 A1* | 2/2010 | Starr et al. ..................... 713/189 |

* cited by examiner

*Primary Examiner* — Allen T Cao
(74) *Attorney, Agent, or Firm* — John H. Holcombe

(57) ABSTRACT

A data storage cartridge comprises data storage media configured to store data for read and/or write access, wherein the data may be arranged in a plurality of partitions; and a plurality of cartridge memories. A control system, for example of a data storage drive, is configured to allocate at least portions of capacity of the data storage media to cartridge memories of the data storage cartridge; and to provide information defining the allocated portions of capacity to the cartridge memories. Each of the cartridge memories may have a separate user and thus provide access for that user to separate partitions.

5 Claims, 5 Drawing Sheets

MANAGING DATA STORAGE MEDIA AND MULTIPLE CARTRIDGE MEMORIES OF A DATA STORAGE CARTRIDGE

CROSS REFERENCE TO RELATED APPLICATION APPLICATIONS

The present Application is a continuation of parent application Ser. No. 11/367,058, filed Mar. 3, 2006 now U.S. Pat. No. 7,660,063. Reference is made to commonly assigned U.S. application Ser. No. 11/367,686 filed on even date therewith relating to a data storage cartridge having a plurality of cartridge memories, now U.S. Pat. No. 7,375,910.

FIELD OF THE INVENTION

The present invention relates to data storage cartridges which comprise data storage media, and, more particularly, to managing data storage cartridges having a cartridge memory.

BACKGROUND OF THE INVENTION

Data storage cartridges comprise data storage media such as magnetic tape, for example wound on at least one reel; such as optical disk, for example, CD, DVD, HD-DVD, other optical disk media; hard disk drive; floppy disk; flash memory; etc.; as are known to those of skill in the art. In many instances the data storage cartridges additionally comprise a cartridge memory. The cartridge memory may comprise a rewritable memory, or a write once memory, or a rewritable memory having a portion thereof which is protected to be write once. The memory may be operated by a processor. Further, the cartridge memory may comprise a communication interface for communicating externally of the data storage cartridge. The communication interface may have an antenna for accomplishing the external communication. The cartridge memory may be positioned within the data storage cartridge so as to orient the antenna to allow access by an external interface, for example, of a data storage drive which is also adapted to read and/or write data with respect to the data storage media. Additionally, the cartridge memory may be positioned to also be read by other external interfaces, for example, of a picker of an automated data storage library, the library arranged to transport the data storage cartridge between storage shelves and one or more data storage drives. The cartridge memory may comprise an internal power source, such as a battery, or may receive power through the communication interface, or a power interface, as is known to those of skill in the art. Typical capacities of the data storage media allows the media to be partitioned.

Data storage drives read and write data with respect to the data storage media, and may provide an interface to read and/or write information with respect to a cartridge memory of the data storage cartridge.

SUMMARY OF THE INVENTION

The present invention comprises methods, computer program products, data storage drives, and control systems configured to provide a service of allocating portions of capacity of data storage media of a data storage cartridge, where the data storage cartridge comprises a plurality of cartridge memories.

In one embodiment, a data storage drive that is configured to read and to write information with respect to data storage media, and to read and to write information with respect to cartridge memories, all of a data storage cartridge, comprises a read/write system configured to read and to write information with respect to the data storage media; a memory interface configured to read and to write information with respect to the cartridge memories; and a control system configured to communicate with the read/write system; communicate with the memory interface; and operate the data storage drive.

In accordance with the present invention, the control system is configured to allocate at least portions of capacity of data storage media of a data storage cartridge to cartridge memories of the data storage cartridge; and to provide information defining the allocated portions of capacity to the cartridge memories.

In a further embodiment, the control system allocates access to the cartridge memories to separate users.

In another embodiment the control system determines whether at least one additional unallocated portion of the capacity of the data storage media is available; and in response to request, allocates at least an additional portion of the available capacity of the data storage media to a cartridge memory.

In a further embodiment, the portions of capacity of the data storage media of the data storage cartridge comprise logical partitions of the data storage media.

In another embodiment, the portions of capacity of the data storage media of the data storage cartridge comprise physical partitions of the data storage media.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
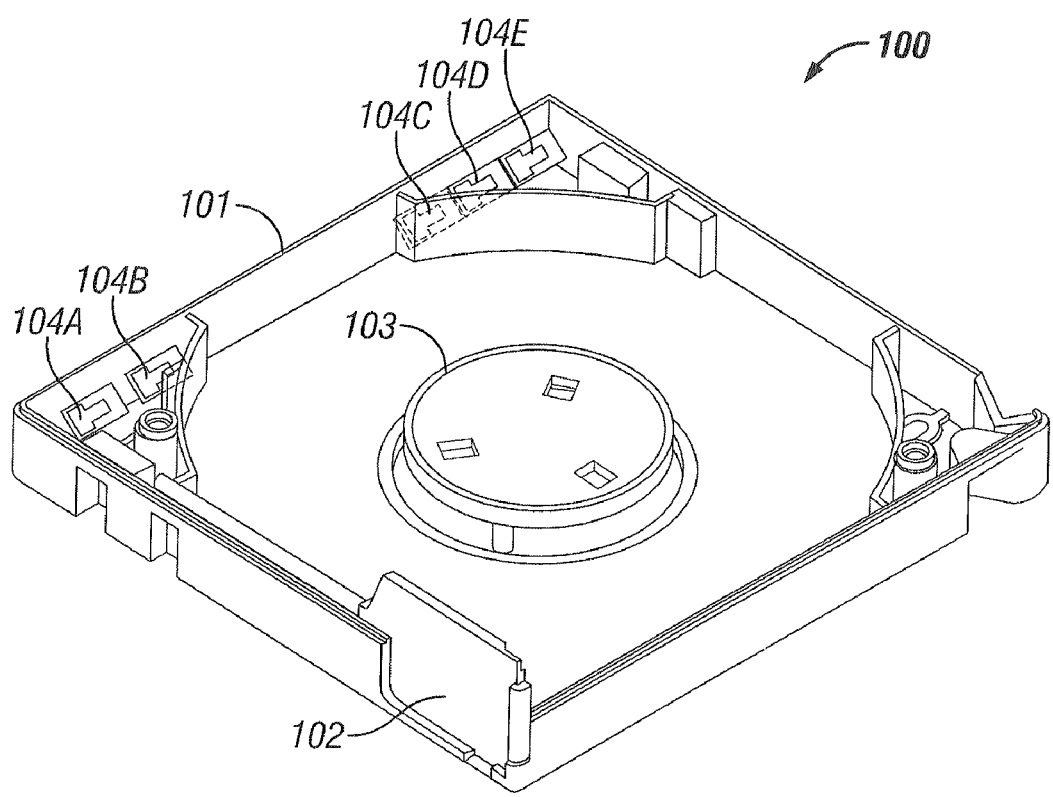
FIG. 1 is an isometric view of a data storage cartridge with the top portion of the container removed, the cartridge having a plurality of cartridge memories.
Figure 2:
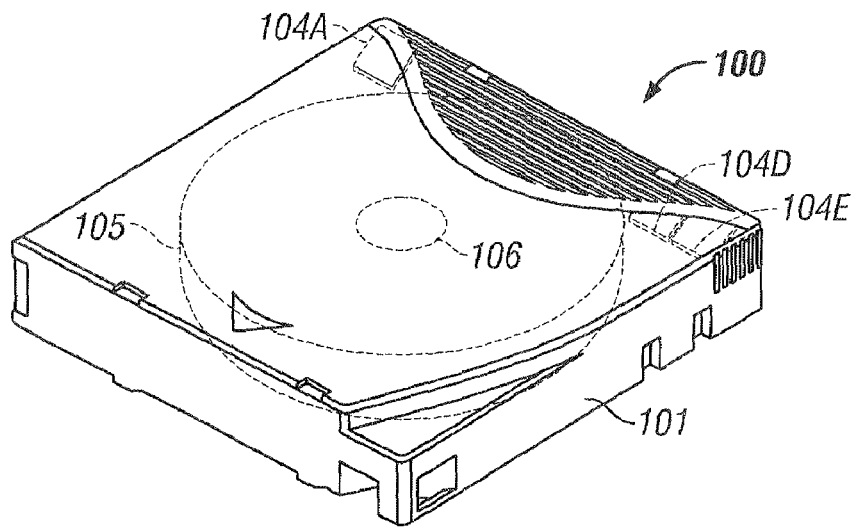
FIG. 2 is a diagrammatic illustration of the data storage cartridge of FIG. 1, with a magnetic tape data storage media.

Referring to FIGS. 1 and 2, an embodiment of a data storage cartridge 100 comprises a container 101, such as a cartridge shell which may comprise one or more parts, a cartridge door 102 which may be opened, for example by a data storage drive, to gain access to data storage media 105, such as a magnetic tape mounted on a tape reel 106. In the case of a magnetic tape, a cartridge brake release button 103 may be provided to allow the tape reel 106 to freely rotate once the cartridge 100 is loaded into a data storage drive. One example of a magnetic tape cartridge comprises a cartridge based on LTO (Linear Tape Open) technology. Another example of a data storage cartridge comprises the IBM® 3592 magnetic tape data storage cartridge.

In accordance with the present invention, a plurality of cartridge memories 104A, 104B, 104C, 104D and 104E are provided. Each of the cartridge memories, for example, comprises a transponder having a contactless interface, which is retained in the cartridge 100, for example, by being encapsulated by the cartridge when it is assembled. The encapsulation process is understood by those of skill in the art as applied to a single cartridge memory.

The illustrated data storage media is a single reel magnetic tape cartridge. Magnetic tape cartridges may also comprise dual reel cartridges in which the tape is fed between reels of the cartridge. Alternatively, the data storage media may comprise any media or device that is capable of being mounted in or supported by a portable cartridge. Examples comprise optical disk, for example, CD, DVD, HD-DVD, other optical disk media; hard disk drive; floppy disk; flash memory; etc.; as are known to those of skill in the art.

Figure 3:
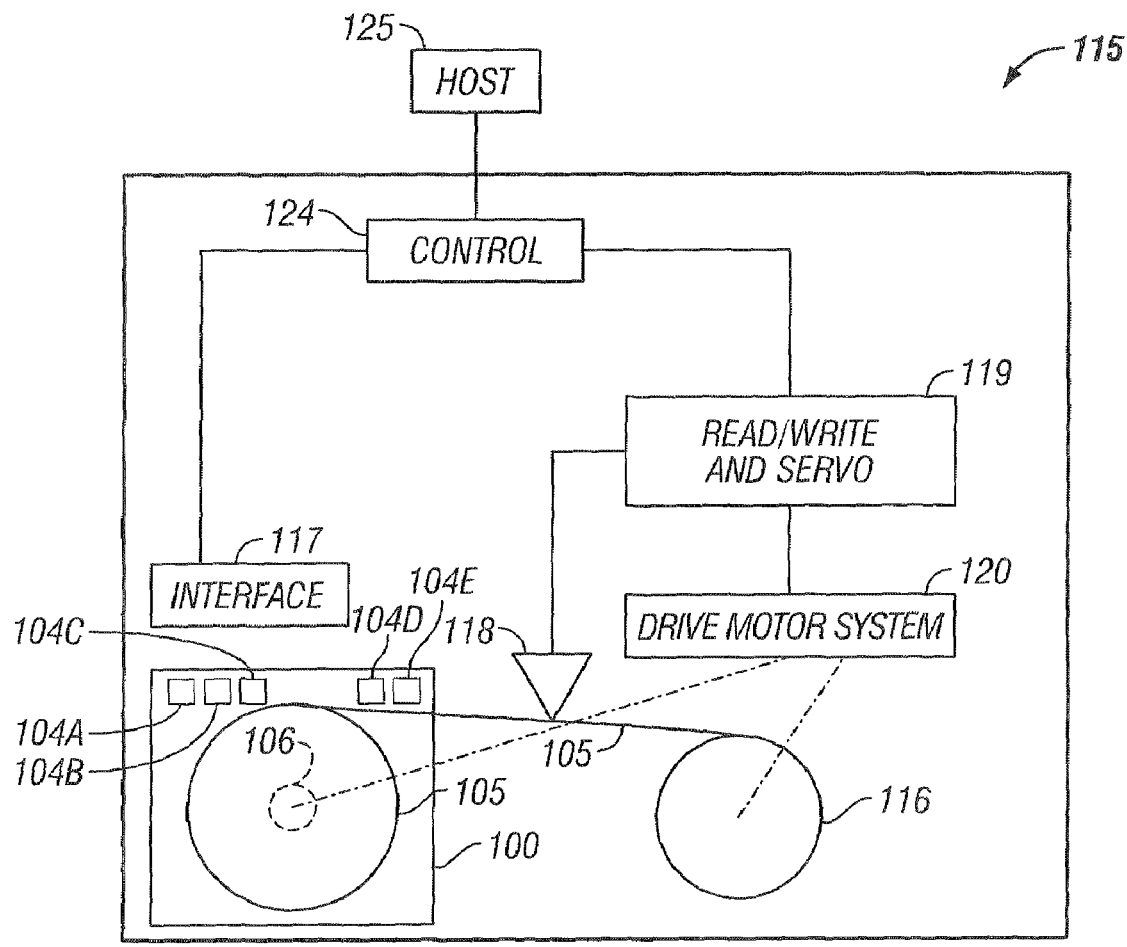
FIG. 3 is a diagrammatic illustration of a data storage cartridge and a data storage drive.

Referring to FIG. 3, a magnetic tape drive 115 is illustrated, in which a data storage cartridge 100 (diagrammatically illustrated) is loaded. One example of a magnetic tape drive in which the present invention may be employed is the IBM 3580 Ultrium magnetic tape drive based on LTO technology, with microcode, etc., to perform desired operations with respect to a magnetic tape cartridge 100. In the instant example, the magnetic tape 105 is wound on a reel 106 in the cartridge 100, and, when loaded in the magnetic tape drive 115, is fed between the cartridge reel and a take up reel 116 in the magnetic tape drive.

The magnetic tape drive comprises a memory interface 117 for reading information from, and/or writing information to, one or more of the cartridge memories 104A, 104B, 104C, 104D and 104E of the magnetic tape cartridge 100, for example, in a contactless manner.

A read/write system is provided for reading and writing information to the data storage media, such as magnetic tape 105, and, for example, may comprise a read/write head system 118 with a servo system for moving the head laterally of the magnetic tape 105, a read/write servo control 119, and a drive motor system 120 which moves the magnetic tape 105 between the cartridge reel 106 and the take up reel 116 and across the read/write head system 118. The read/write and servo control 119 controls the operation of the drive motor system 120 to move the magnetic tape 105 across the read/write head system 118 at a desired velocity, and, in one example, determines the location of the read/write and servo head system with respect to the magnetic tape 105. In one example, the read/write head system 118 and read/write and servo control 119 employ servo signals on the magnetic tape 105 to determine the location of the read/write head system, and in another example, the read/write and servo control 119 employs at least one of the reels, such as by means of a tachometer, to determine the location of the read/write and servo head system with respect to the magnetic tape 105. The read/write head system 118 and read/write and servo control 119 may comprise hardware elements and may comprise any suitable form of logic, including a processor operated by software, or microcode, or firmware, or may comprise hardware logic, or a combination.

A control system 124 communicates with the memory interface 117, and communicates with the read/write system, e.g., at read/write and servo control 119. The control system 124 may comprise any suitable form of logic, including a processor operated by software, or microcode, or firmware, or may comprise hardware logic, or a combination.

The illustrated and alternative embodiments of data storage media and associated drives are known to those of skill in the art.

The control system 124 typically communicates with one or more host systems 125, and operates the data storage drive 115 in accordance with commands originating at a host. Alternatively, the data storage drive 115 may form part of a subsystem, such as a library, and may also receive and respond to commands from the subsystem.

As illustrated, the data storage drive 115 provides information to the cartridge memories 104A, 104B, 104C, 104D and 104E of the magnetic tape cartridge 100, and provides data to the magnetic tape 105 of the magnetic tape cartridge 100.

Figure 5:
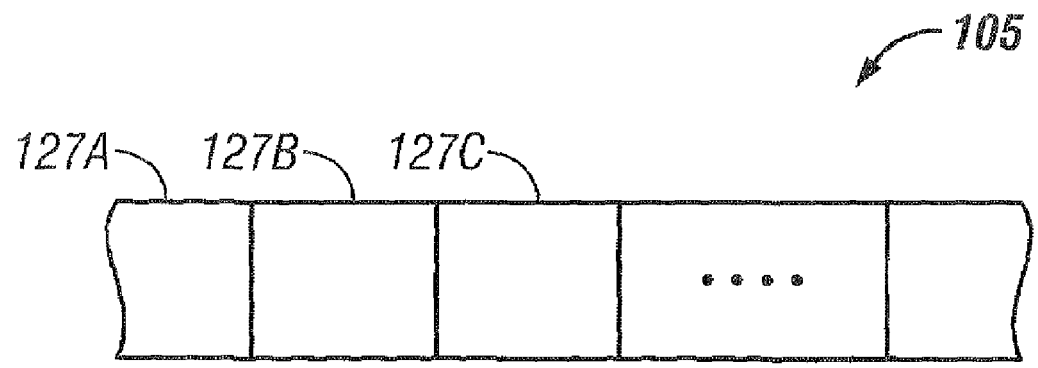
FIG. 5 is a diagrammatic illustration of a partitioned data storage media.

Referring to FIG. 5, a magnetic tape 105 or other data storage media may be organized in many ways. Typically, a magnetic tape is arranged with parallel tracks, and may also be arranged with several parallel serpentine wraps of groups of parallel tracks. In one example, the magnetic tape is moved longitudinally in a first direction while the head system reads and/or writes data with respect to one wrap, and is reversed to be moved in the opposite direction and the head system is shifted to another wrap.

In FIG. 5, the information is shown laid out as a single wrap for the purpose of illustration. The data storage media may comprise a high level of capacity for storing data, and may be divided into a plurality of partitions 127A, 127B, 127C, etc. Each of the partitions may be logical partitions that are logically organized anywhere within the magnetic tape or other the data storage media, or may be physical partitions that are physically separate areas, such as a group of parallel tracks. Herein, a "physical" partition may comprise a track, group of tracks, a serpentine group of tracks, or any other arrangement or grouping of data of a magnetic tape data tracks, or specific arrangement of sequential or spaced grouping of data of an optical disk, for example, CD, DVD, HD-DVD, other optical disk media; hard disk drive; floppy disk; flash memory; etc.; as are known to those of skill in the art.

Data recorded on magnetic tape typically is in the form of "data sets" or similar arrangements of data. A single partition may comprise, for example, hundreds or thousands of data sets. An area at or near the front end of the magnetic tape 105 may be provided, called the "beginning of tape" (BOT) as is known to those of skill in the art. In a single reel magnetic tape cartridge, this is the area of one or more wraps near the front end of the magnetic tape (leader block) that is loaded into the take up reel 116 of the magnetic tape drive 115 as depicted in FIG. 3. In a dual reel magnetic tape cartridge, an area of the magnetic tape near the center, about halfway between one reel and the other, is typically designated the BOT, and may comprise one or more wraps. Such a dual reel magnetic tape cartridge is also referred to as a midpoint load tape. This BOT area is typically where information about the magnetic tape is kept, such as an index, and may comprise an indication of the locations of the partitions 127A, 127B, 127C, etc., of FIG. 5 and other information about the partitions.

Figure 4:
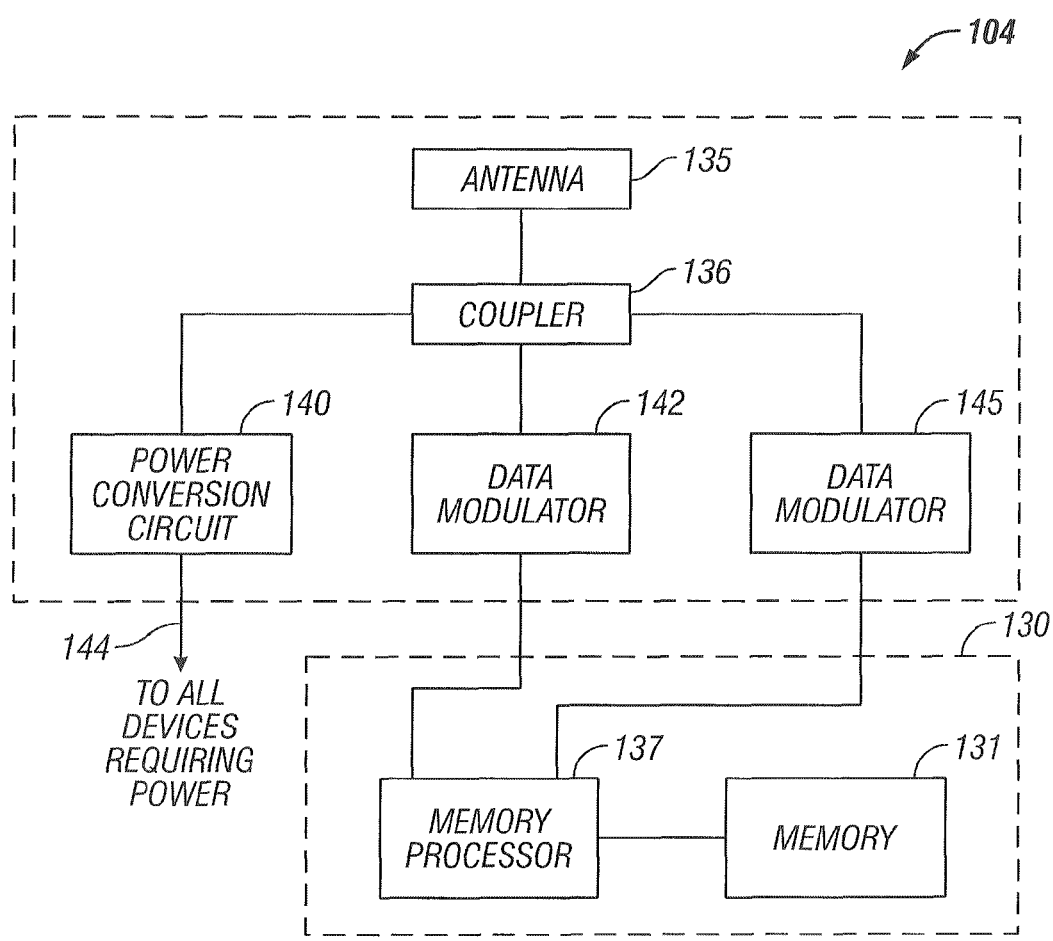
FIG. 4 is a diagrammatic illustration of an embodiment of a cartridge memory of FIG. 1.

Referring to FIG. 4, an embodiment 104 of the cartridge memories 104A, 104B, 104C, 104D and 104E comprises a communication interface 126 configured to communicate externally of the data storage cartridge; and a memory system 130 configured to store information and to communicate the information to the communication interface.

The cartridge communication interface 126 may comprise a wireless interface or transponder which receives power and data from, and sends data to, the interface 117 of the data storage drive when the data storage cartridge 100 is mounted in the data storage drive 115. For example, the wireless interface 126 is an RF wireless interface. An example is described in U.S. Pat. No. 4,941,201. A high frequency inductive wireless interface may also be employed, which is of sufficiently high frequency that the magnetic storage media 105 is not adversely affected by the signal. Examples are described in U.S. Pat. Nos. 4,650,981, 4,758,836, and 3,859,624. Alternatively, the inductive antennae for the wireless interface are shielded from the magnetic tape 105.

An antenna 135 receives the RF signal from the RF interface of the data storage drive, and coupler 136 supplies the received signal to a power conversion circuit 140, and to a data demodulator 142. The power conversion circuit 140 converts the received signal to a power current, supplying the current on line 144 to all of the devices in the data storage cartridge requiring power, including the memory system 130, the data demodulator 142, and a data modulator 145. The received signal from antenna 135 may be encoded, and data demodulator 142 receives the incoming coded signal from coupler 136 and demodulates the signal to provide data signals to the memory system 130. Data signals from the memory system 130 are provided to the data modulator 145 which encodes the signals for transmission by coupler 136 and antenna 135 to the RF interface of the data storage drive.

The memory system 130 may comprise a memory processor 137, such as logic or a microprocessor chip, for example, an Intel Pentium chip arranged to operate in a low power environment, such as a portable computer, and an associated nonvolatile memory 131 that is also arranged to operate in a low power environment.

The processor may have computer readable program code embodied therein, including suitable security and encryption/decryption algorithms, and the logic for accessing and operating the memory 131. The memory 131 may comprise a nonvolatile storage, as is known to those of skill in the art. The nonvolatile storage may comprise a separate chip attached to the logic or microprocessor 137, or may comprise a portion of the same chip. The computer readable program code may be stored in a nonvolatile internal memory of the processor 137 or may also be stored in the nonvolatile memory 131, and loaded into the processor 137. Alternatively, the cartridge memory 104 may be operated by and the nonvolatile memory 131 accessed by a control system or processor of the data storage drive or an associated host system.

Figure 6:
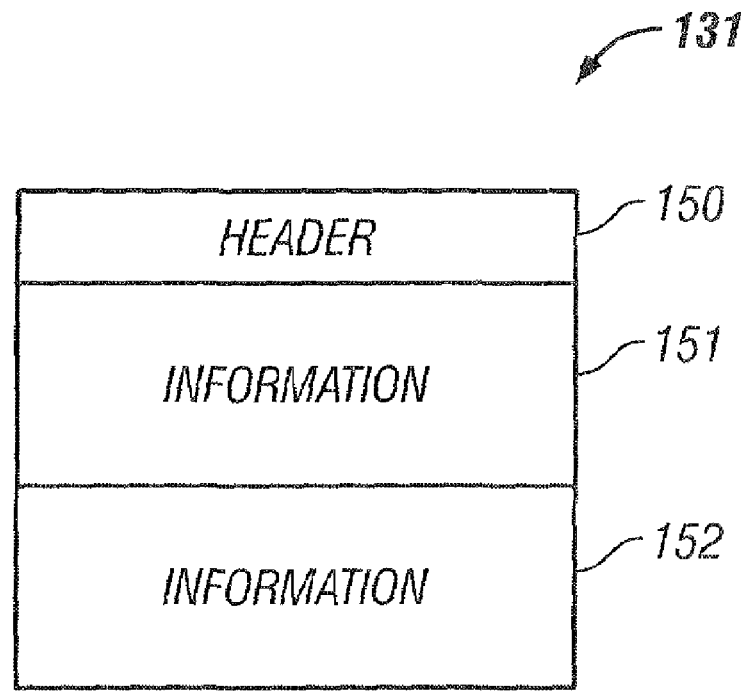
FIG. 6 is a diagrammatic illustration of an embodiment of the format of the memory system of the cartridge memory of FIG. 4.

Referring to FIG. 6, an example of the content of the cartridge memory 104 of the magnetic tape cartridge 100 of FIGS. 1, 2, 3 and 4 is illustrated. One example of a cartridge memory 104 and its content is described in Standard ECMA-319, June 2001, "Data Interchange on 12, 7 mm 384-Track Magnetic Tape Cartridges—Ultrium-1 Format", Annex D—LTO Cartridge Memory, pp. 95-115. As one example, the cartridge memory 104 is arranged in areas of various sizes with information organized into "pages". The cartridge memory 104 may be similar to the memory and transponder used in "smart cards" as are known to those of skill in the art. Those of skill in the art may envision additional types of cartridge memories.

The memory 131 of the memory system 130 may, as illustrated in FIG. 6, be formatted to comprise a header 150 and various information areas 151, 152. The header 150 will incorporate information about the information areas, and about the uses of the information, and may incorporate specific identification and security information.

In accordance with one embodiment of the present invention, the memory system 130 is formatted to allow association with at least one of the plurality of partitions 127A, 127B, 127C, etc. of the data storage media. For example, information area 151 of the memory system of cartridge memory 104C may be associated with partition 127C of FIG. 5.

In this manner, each of the cartridge memories 104A, 104B, 104C, 104D and 104E of the magnetic tape cartridge 100 of FIGS. 1, 2, 3 and 4 may be associated with a different partition 127A, 127B, 127C, etc. of the data storage media of FIG. 5. The association may mean that information regarding the data of the associated partition is contained in the storage area. Additionally, the association may comprise information contained in the storage area that allows management of the partition by the data storage drive or the host, including security and handling of the data.

Further, each logical partition could have its own physical owner, for example, a user of the data storage drive or host. Thus, there could be multiple owners of the physical data storage media or cartridge, each under management incorporating the information of a separate cartridge memory 104A, 104B, 104C, 104D and 104E.

With multiple cartridge memories servicing multiple partitions, the access to the tape cartridge is virtualized and the cartridge may interface with a storage area network (SAN) to which the data storage device is attached.

In a further embodiment, each of the cartridge memories 104A, 104B, 104C, 104D and 104E is separately addressable.

In one embodiment, the communication interface of each of the cartridge memories comprises a radio frequency interface operating at a different frequency. For example, the communication interfaces 126 of FIG. 4 comprise circuits 135 comprising an inductive antenna loop and capacitor, wherein the capacitors have different capacitances to provide the different frequencies. The different frequencies would alternatively allow simultaneous access to more than one or all of the cartridge memories by communication at all of the frequencies, or allow access to only one cartridge memory at a particular frequency.

Alternatively, the communication interface 126 of each of the cartridge memories comprises a separately addressable digital interface. For example, each cartridge memory could have its own unique identifier. By requiring the identifier to be embedded in Input/Output (I/O) commands (for writing to and reading from the cartridge memory), reading and writing to individual cartridge memories can be accomplished.

In a further embodiment, each of the cartridge memories comprises provision for a separate password to gain read and/or write access to the memory system. The password(s) may be stored in the header 150 of the nonvolatile memory 131 of FIG. 6. The term "password" is intended to reference any suitable authentication algorithm to allow user access to the information of the cartridge memory and/or the associated partition.

In a further embodiment, the memory system of each of the cartridge memories is configured to format the information to allow association with a subset the plurality of partitions 127A, 127B, 127C, etc. of the data storage media. For example, information area 151 of the memory system of cartridge memory 104C may be associated with partitions 127B and 127C of FIG. 5.

In a still further embodiment, the memory system of at least one of the cartridge memories is configured to format the information to allow redundancy between at least a portion of the information of another of the cartridge memories. For example, information area 151 of the memory system of cartridge memory 104C may be associated with partition 127B, and information area 152 may duplicate at least a portion of the information area or of the header of cartridge memory 104B. Additionally, failover information may be provided in the header 150 or in the information area 151 such that a failure of one of the cartridge memories will cause a failover to the redundant information in another cartridge memory and therefore not cause failure of the cartridge. The processor 137 may have the necessary algorithms to make the failover transparent to the user, and/or provide an error flag or message to the user or an administrator.

Referring to FIG. 1, in accordance with an embodiment of the present invention, each of the cartridge memories 104A, 104B, 104C, 104D and 104E is supported by the container 101 positioned such that the communication interface is simultaneously accessible externally of the data storage cartridge 100, for example, by the interface 117 of the data storage drive 115 of FIG. 3. Referring to FIG. 4, in one embodiment, the cartridge memories are supported by the container such that the antenna 135 of each of the cartridges is oriented in a similar direction to allow the simultaneous access. In the example, each of the cartridge memories is oriented at substantially a 45° angle with respect to the bottom and side of the container 100 of FIG. 1 so as to allow simultaneous access to all of the cartridge memories either by the data storage drive or by a picker of an automated data storage library, which are at relatively different angles with respect to a cartridge.

Figure 7:
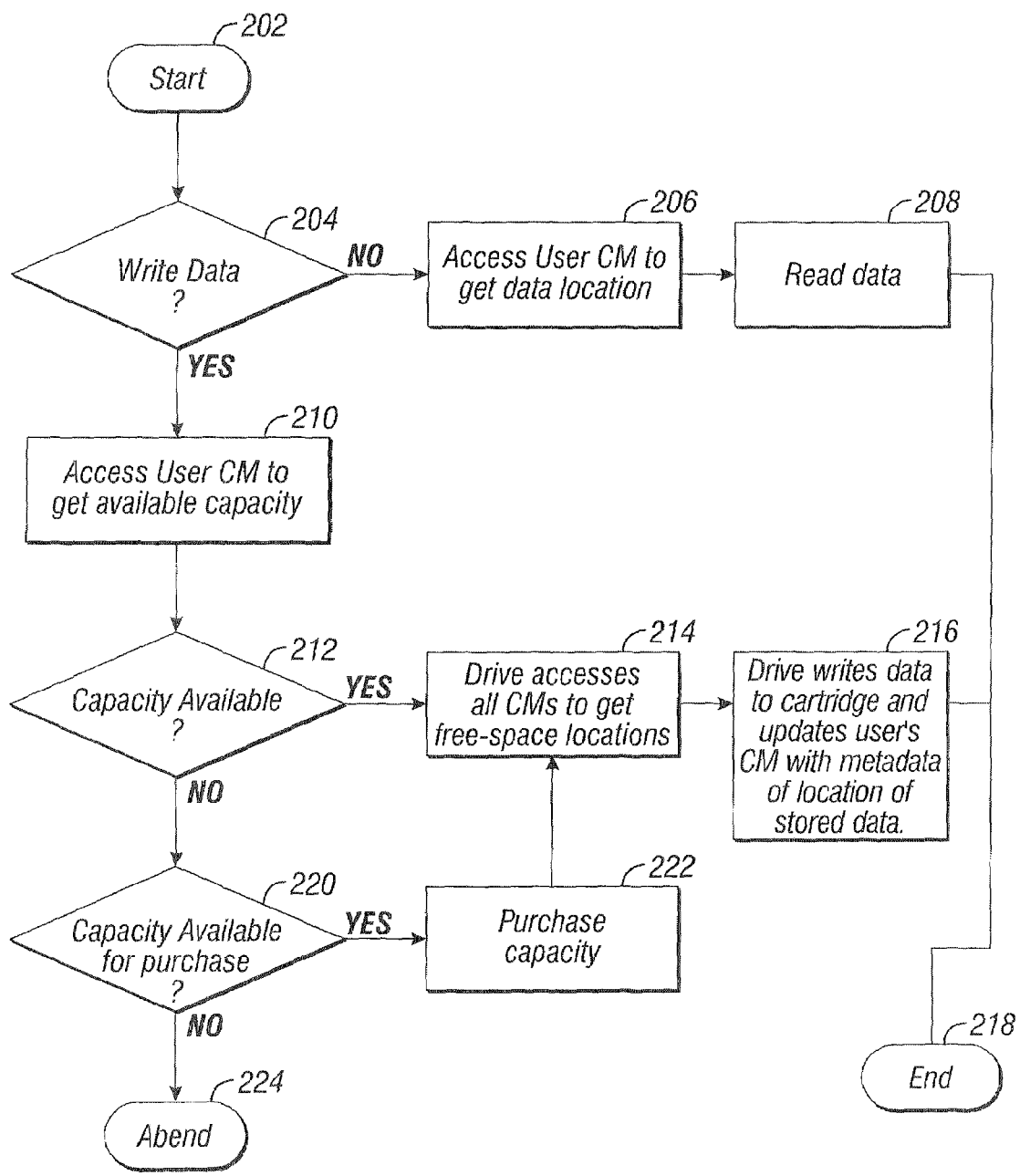
FIG. 7 is a flow chart depicting embodiments in accordance with the present invention.

Referring to FIGS. 3 and 7, in accordance with the present invention, the control system 124, for example, of a data storage drive 115, provides the service of allocating portions of capacity of the data storage media 105 of a data storage cartridge 100 to ones of the cartridge memories 104A, 104B, 104C, 104D and 104E of the data storage cartridge; and provides information defining the allocated portions to the ones of the cartridge memories to which capacity is allocated. The term "ones of cartridge memories" refers to the allocation of capacity separately to each of a plurality of the cartridge memories, up to and including all of the cartridge memories.

In one embodiment, a capacity limit is placed on each user's cartridge memory 104A, 104B, 104C, 104D and 104E. If the user desires additional capacity, the additional capacity, for example, is requested and may be allocated or purchased.

In one embodiment, illustrated in FIG. 7, capacity is allocated on write operations, since read operations relate to preexisting capacity. Starting from step 202, step 204 determines whether a write operation is being requested by a user. A user may comprise a system, an individual, or an entity, or any combination, having access to the data storage drive and to the data storage media. If step 204 determines that the access is other than a write operation, for example a read operation, access is granted for the other process. For example, the access may be for a read operation, and, in step 206, the cartridge memory for the requesting user is accessed to determine the location on the media of the desired data, and, in step 208, the other operation is conducted.

If step 204 determines that the user is requesting a write operation, step 210 accesses the cartridge memory assigned to the user to ascertain the present capacity allocated to the cartridge memory and to the user. If no cartridge memory was assigned to the user, that assignment may be arranged.

The capacity allocated to a user's cartridge memory 104A, 104B, 104C, 104D and 104E, may be provided in one of two ways, logical partitions which may be allocated anywhere in the data storage media; or physical partitions which may be physically separate areas, such as a group of parallel tracks, as defined above.

Step 212 determines whether sufficient capacity is allocated to the cartridge memory and the user for the desired write operation, or alternatively, for a desired total capacity allocation. If sufficient capacity allocation has been made, and the allocation is logical capacity, the specific locations of the partitions may be made in step 214. Step 214 accesses all of the cartridge memories to find the free-space locations of the data storage media, and identifies specific locations for the user's write operation or request. Alternatively, the allocations may comprise one or more physical portions of the capacity, and the cartridge memory metadata describes the physical partitions and step 214 determines the free-space locations within the preexisting physical partition(s). In step 216, the write operation is conducted by the user, and the user's cartridge memory is updated with metadata of the location of the stored data.

If step 212 indicates that there is not sufficient capacity allocated to the cartridge memory and the user for the desired request, for example, for a write operation, or alternatively, not sufficient capacity allocated for a requested total capacity allocation, step 220 determines whether the data storage media has sufficient remaining capacity available to meet the request. If there is not sufficient remaining capacity available in the data storage media 105, the process abends in step 224.

If step 220 determines that there is sufficient remaining capacity in the data storage media 105 to meet the request, step 222 allocates portion(s) of capacity of the data storage media of the data storage cartridge to the one of the cartridge memories to meet the request. The allocated portion(s) of capacity may comprise one or more logical partitions or one or more physical partitions. In step 222, the user's cartridge metadata is updated with information defining the allocated portions of capacity. In step 216, the write operation is conducted by the user, and the user's cartridge memory is updated with metadata of the location of the stored data.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A control system configured to control reading and writing information with respect to data storage media of a data storage cartridge, and control reading and writing information with respect to cartridge memories of a data storage cartridge data storage cartridge, comprising:
   logic configured to implement the steps of:
   allocating at least portions of capacity of said data storage media of a data storage cartridge to ones of said cartridge memories of said data storage cartridge; and
   providing information defining said allocated portions of said capacity to said ones of said cartridge memories to which capacity is allocated.

2. The control system of claim 1, wherein said logic is additionally configured to implement the step of:
   assigning said cartridge memories to separate users.

3. The control system of claim 2, wherein said logic is additionally configured to implement the steps of:
   determining whether at least one additional unallocated portion of said capacity of said data storage media is available; and
   in response to request, allocating at least an additional portion of said available capacity of said data storage media to a cartridge memory.

4. The control system of claim 3, wherein said portions of capacity of said data storage media of said data storage cartridge comprise logical partitions of said data storage media.

5. The control system of claim 3, wherein said portions of capacity of said data storage media of said data storage cartridge comprise physical partitions of said data storage media.

* * * * *